C. MOORE.
SOUND RECORDING MEANS.
APPLICATION FILED FEB. 7, 1919.
1,335,595. Patented Mar. 30, 1920.
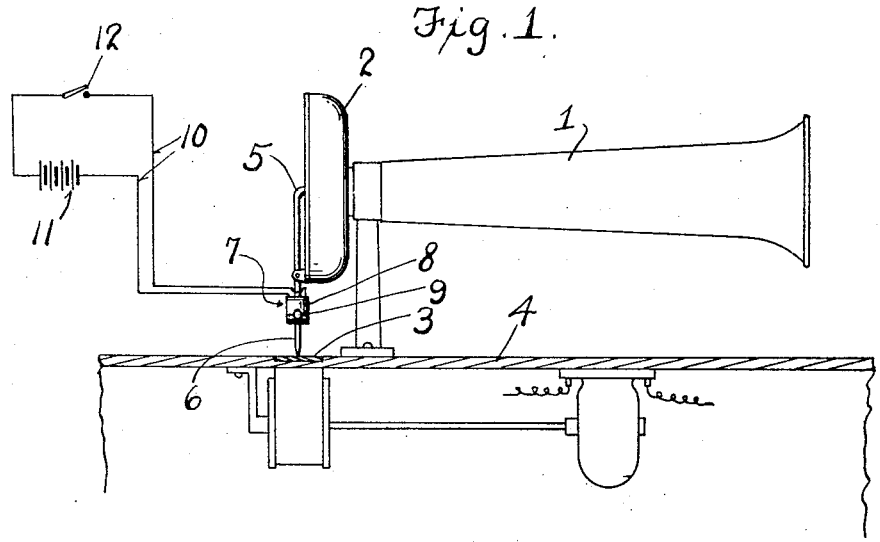
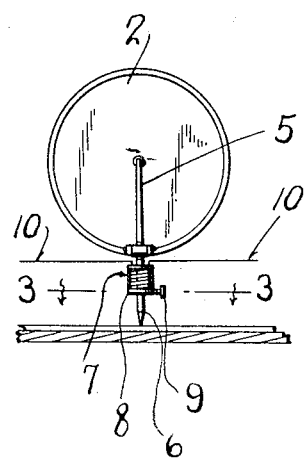
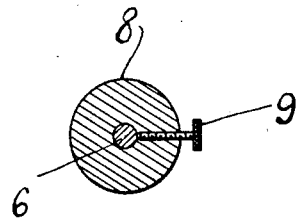
Inventor
C. Moore
By Victor J. Evans
Attorney
Witnesses
L. B. James

UNITED STATES PATENT OFFICE.

CHRISTIAN MOORE, OF AKRON, OHIO.

SOUND-RECORDING MEANS.

1,335,595.  Specification of Letters Patent.  Patented Mar. 30, 1920.

Application filed February 7, 1919. Serial No. 275,593.

*To all whom it may concern:*

Be it known that I, CHRISTIAN MOORE, a subject of the Emperor of Austria-Hungary, residing at Akron, in the county of Summit and State of Ohio, have invented new and useful Improvements in Sound-Recording Means, of which the following is a specification.

My present invention pertains to means for recording sounds; and it has for its general object to provide a sound recording apparatus, which while exceedingly simple and inexpensive in construction is highly efficient in recording sound vibrations on a strip of celluloid or other material and this accurately and delicately so that the variations in the sound are nicely brought out.

With the foregoing in mind, the invention will be fully understood from the following description and claim when the same are read in connection with the drawings, accompanying and forming part of this specification, in which:

Figure 1 is a view illustrating my novel apparatus in conjunction with a horn, a diaphragm and the strip or other body on which the sound is to be recorded.

Fig. 2 is a detailed view, taken at right angles to Fig. 1 and showing the apparatus in conjunction with the diaphragm alone.

Fig. 3 is a transverse section taken in the plane indicated by the line 3—3 of Fig. 2 and illustrating the manner in which the casing of the resistance coil is fixed on the style arm of the recording lever.

Similar numerals of reference designate corresponding parts in all of the views of the drawings.

The apparatus illustrated comprises a conventional or any other suitable horn 1, a diaphragm 2 arranged by preference in the usual relation to the horn, a strip or other body 3, suitably maintained in position by holding means 4, and a lever 5 fulcrumed at an intermediate point of its length and having one of its arms arranged in the usual manner relative to the diaphragm 2 and also having a recording style 6 at the extremity of its other arm, disposed in the ordinary well known manner with respect to the strip or body 3 upon which the record is to be made.

In furtherance of my invention I provide the last-named arm of the lever 5 with a resistance coil 7, which surrounds the said arm and is inclosed in a case 8, which latter is adjustably fixed upon the arm through the medium of a set screw 9. From this it follows that the resistance coil with its case may be expeditiously and easily fixed in an adjustable manner on the arm of the style lever, and hence the position of the resistance coil relative to the style may be nicely varied according to the extent to which it is desired to heat the style in order to produce the best recording results on the material of which the strip or body 3 is composed.

In practice, the terminals of the resistance coil are designed to be connected through the medium of wires 10 with the poles of a source of electric energy indicated diagrammatically at 11. I also prefer to employ in practice a switch 12 in circuit with the resistance coil and the source of electrical energy, so that the current may be supplied to or cut off from the resistance coil at the will of the operator.

Manifestly, when the switch is closed and current is sent through the convolution of the resistance coil the style 6 will be heated and in that way will be adequately adapted to accurately record sound vibrations on or in a strip or body of celluloid or other material suitable to the purpose. It will also be readily appreciated that by manipulating the switch 12 the operator is enabled to quickly and easily vary the heating of the style 6 and in that way produce the best results in the record making.

It will further be noted that inasmuch as the resistance coil is carried in a case adapted to be handled as a unit, the resistance coil and its case may be expeditiously and easily fixed upon and as readily moved on the style lever when occasion demands.

Having described my invention, what I claim and desire to secure by Letters Patent, is:—

In sound recording apparatus, the combination of the diaphragm of a sound box, a lever fulcrumed at an intermediate point of its length and having one of its arms operatively arranged relatively to the diaphragm and its other arm equipped with a style, a casing slidably arranged on the last-named arm of the lever, a resistance coil arranged in the casing and movable therewith and adapted to be arranged in circuit with a source of electrical energy, and means adjustably fixing the casing on said lever arm.

In testimony whereof I affix my signature.

CHRISTIAN MOORE.